C. A. NORMAN.
CONTINUOUS COMBUSTION ENGINE.
APPLICATION FILED FEB. 23, 1918.

1,302,582.

Patented May 6, 1919.
2 SHEETS—SHEET 1.

WITNESSES:
R. L. Clapper
W. T. Magruder

INVENTOR.
Carl A. Norman

C. A. NORMAN.
CONTINUOUS COMBUSTION ENGINE.
APPLICATION FILED FEB. 23, 1918.
1,302,582.
Patented May 6, 1919.
2 SHEETS—SHEET 2.
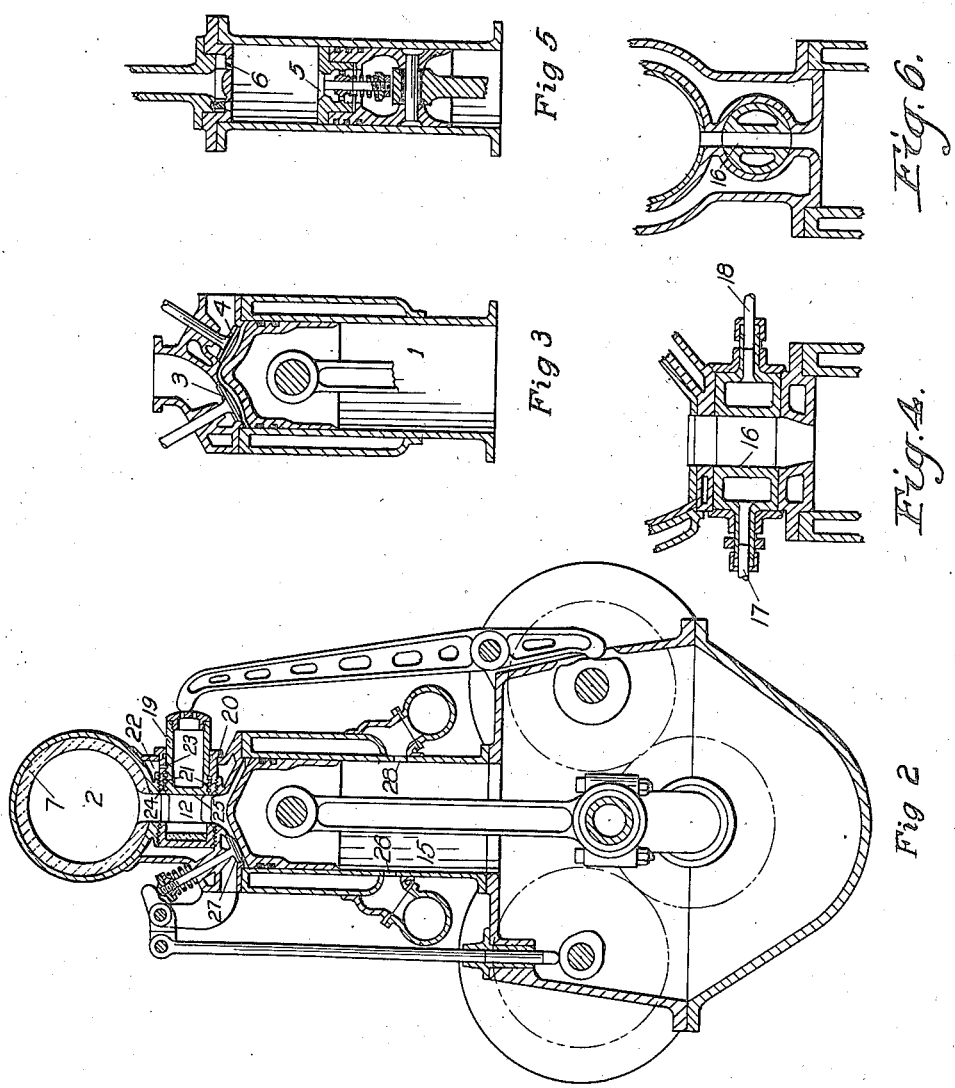
WITNESSES:
INVENTOR.
Carl A. Norman
BY
ATTORNEYS.

UNITED STATES PATENT OFFICE.

CARL A. NORMAN, OF COLUMBUS, OHIO.

CONTINUOUS-COMBUSTION ENGINE.

1,302,582.  Specification of Letters Patent.  Patented May 6, 1919.

Application filed February 23, 1918. Serial No. 218,809.

*To all whom it may concern:*

Be it known that I, CARL A. NORMAN, a citizen of the United States, residing at 1990 Summit street, in the city of Columbus, in Franklin county, State of Ohio, hereby apply for Letters Patent on certain new and useful arrangements of Continuous-Combustion Engines, of which the following is a specification.

Continuous combustion engines possess certain advantages over explosion engines, mainly as follows:

(a) They can completely and in the simplest manner utilize any kind of liquid or gaseous fuel.

(b) They possess no carbureters, and no timed ignition devices, liable to get out of order.

(c) They can attain a good thermal efficiency without the use of very high pressures or very high temperatures.

(d) They can utilize the exhaust heat to increase efficiency and in this manner attain fuel economies as good as or better than those of any existing explosion or injection engines.

The gradual depletion of the supply of more volatile oils like gasolene makes the introduction of the continuous combustion engine very desirable. The difficulty to be overcome is this: For the engine to be efficient the temperature in the combustion chamber should not be lower than that of an ordinary explosion engine. To this high temperature the inlet valves of the engine will be continuously exposed, unless special arrangements be made. The invention here described is, among other things, aimed to overcome this difficulty in a thoroughly practical manner.

For the purpose of description, a continuous combustion engine comprising one compressor cylinder and three expansion cylinders will be selected as an example. The engine can, however, consist of any number of compressor cylinders and any number of expansion cylinders, provided only that the diameters and strokes of these cylinders be so proportioned that the volume of compressed air, or air and gas, supplied by the compressors to the combustion chambers will stand in a correct proportion to the amount of combustion gases absorbed by the expansion cylinders in regular working.

Fig. 2 is a transverse vertical sectional view of the engine.

Fig. 3 is a similar view taken through the compressor cylinder.

Fig. 4 is a detailed sectional view of a water cooled valve, which may be employed in controlling the admission of the working gases into the cylinders of the engine.

Fig. 5 is a slightly modified form of piston and valve structures for use in connection with the compressor cylinder.

Fig. 6 is a transverse sectional view taken through the valve structure disclosed in Fig. 4.

Figure 1:
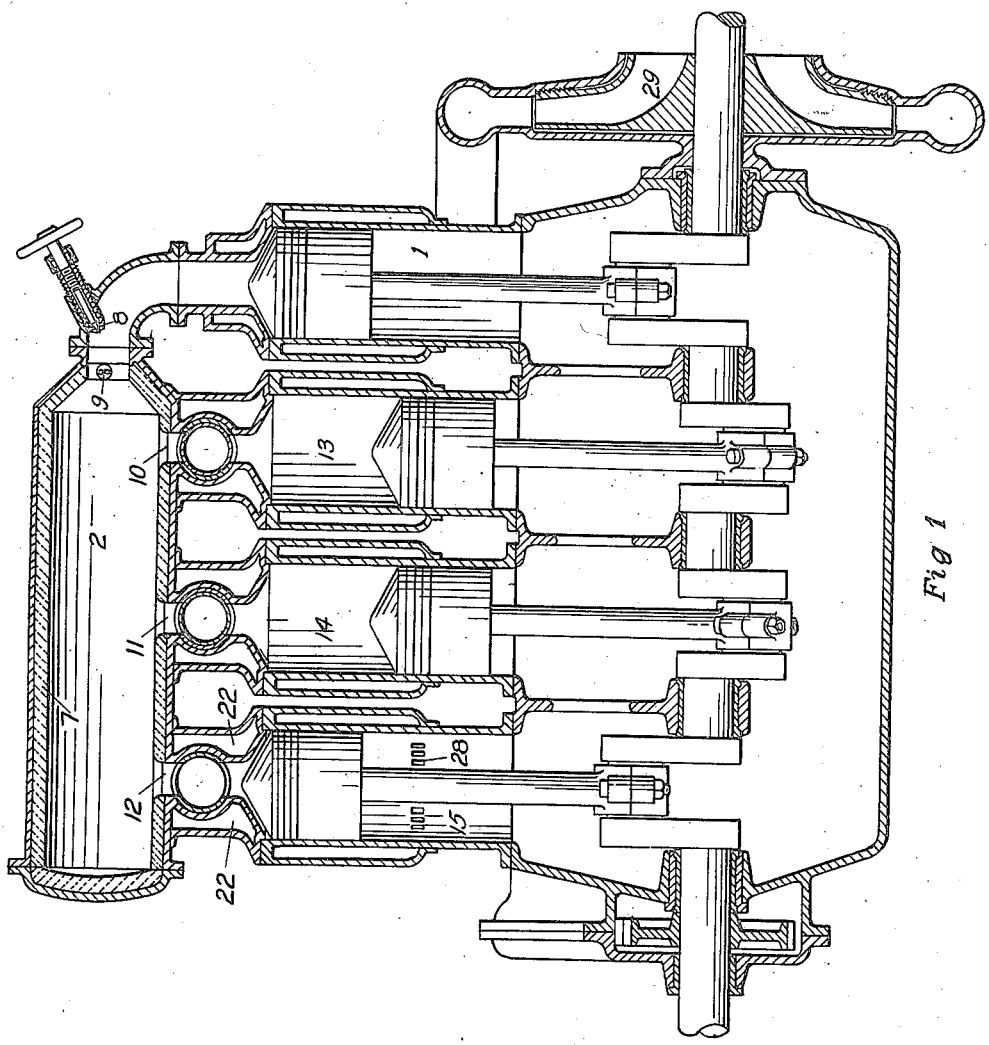
Figure 1 is a longitudinal sectional view taken through my improved engine.

1 in Fig. 1 and Fig. 3 is a compressor cylinder pumping air at increased pressure into the combustion chamber 2. The compressor is shown provided with puppet valves 3 and 4, positively operated by push rod and trigger as in Fig. 2. This may be desirable for high speed; at lower speeds the compressor may, however, preferably be provided with disk valve in the piston, as 5 in Fig. 5, and a plate valve 6, or by any other automatic valve arrangement well known in the art.

The combustion chamber 2 is preferably lined with a refractory lining 7 which prevents heat losses and maintains combustion by becoming incandescent. The fuel, if liquid, enters through a nozzle 8, of any suitable construction, injection air not being necessary, however. For starting, a spark plug is shown at 9. Starting without a spark plug is, however, also possible. The combustion chamber can, for instance, be started open by applying an ordinary blow torch or hot bar and be closed after combustion has commenced. The gases issue after combustion through passages 10, 11 and 12 into the working cylinders 13, 14 and 15. The inlet is governed by inlet valves, two constructions of which are shown for illustration. In Fig. 4 is shown a water-cooled rotary valve 16, water being admitted through pipe 17 and discharged through pipe 18.

In Fig. 2 is shown a valve of new and peculiar construction. 19 is a cylinder of copper or other highly heat conducting material, sliding in the sleeve 20. In this sleeve are grooves 21. Similar, though shallower, grooves may be located in the cylinder 19 as shown. The space 22 may be filled with pure water, or may be filled with fuel. The liquid in either case being under sufficient pressure to prevent leakage of gas from the passage 12 into the space 22, or to atmosphere. This liquid is admitted to the grooves through openings 23 and communicating passages 24. I have found by experiment that with a valve cylinder made of copper, heat will be conducted away from the face 25 to the cooled portions of the cylinder fast enough to prevent overheating and undue distortion. The cooling effect with the valve closed will be increased by the evaporation of small portions of the liquid carried out into the combustion space in the grooves of the copper cylinder and there evaporated. In case of water being used for cooling, minute quantities may also be admitted through fine holes into the interior of the cylinder 19.

After cut off, the gases expand in the cylinders 13, 14 and 15, and may be discharged through port openings 26 and the exhaust valve 27, Fig. 2, or wholly through exhaust valve 27. In any case it is advisable to admit cool scavenging air through ports 28, to aid in cooling the cylinder. Exhaust valve 27 may close about the middle of the stroke, causing the cooler air to be compressed. If the compression is carried to a pressure slightly above the pressure obtaining in the combustion chamber and the inlet valve is opened somewhat early, a gust of this cooler air will pass past the passage 12, cooling the heated surfaces.

The scavenging air is here shown, furnished by the centrifugal fan 29, Fig. 1.

It is found that water injection in the compressor 1, by reducing compression work and maximum temperature, hence cooling losses, may increase the thermal efficiency of the engine. Water injection in the combustion chamber, however, may be resorted to in order to lower undesirably high temperatures, but if introduced with temperatures that can be handled, it will lower efficiency.

What I claim as new and desire to secure by Letters Patent of the United States, is:

In a continuous combustion engine, the combination of one or more compressors, a combustion chamber receiving air therefrom, one or more working cylinders receiving gas from said combustion chamber and being provided with inlet and exhaust valves, means for admitting scavenging air to said cylinders, and the closing of the exhaust and the opening of the inlet valves being so timed that part of the scavenging air will be discharged into the combustion chamber.

Columbus, this 11th day of February, 1918.

CARL A. NORMAN.

Witnesses:
R. L. CLAPPER,
WM. T. MAGRUDER.